(12) United States Patent
Yoneyama et al.

(10) Patent No.: US 6,771,954 B1
(45) Date of Patent: Aug. 3, 2004

(54) REMOTELY CONTROLLING OPERATION MODE OF PORTABLE WIRELESS COMMUNICATION TERMINALS

(75) Inventors: Tokuji Yoneyama, Tokyo (JP); Kenji Aoyama, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 226 days.

(21) Appl. No.: 09/657,696

(22) Filed: Sep. 8, 2000

(30) Foreign Application Priority Data

Sep. 9, 1999 (JP) .......................................... 11-255291

(51) Int. Cl.[7] .............................................. H04Q 7/32
(52) U.S. Cl. .................................... 455/420; 455/410
(58) Field of Search ........................ 455/410, 418–419, 455/420, 565, 414.1, 411, 404.1

(56) References Cited

U.S. PATENT DOCUMENTS

| | | | |
|---|---|---|---|
| 5,659,595 A | * | 8/1997 | Chanu et al. ............... 455/411 |
| 5,734,978 A | * | 3/1998 | Hayatake et al. ........... 455/410 |
| 5,862,472 A | * | 1/1999 | Park ............................ 455/411 |
| 5,924,025 A | * | 7/1999 | Kaplan et al. .............. 455/411 |
| 5,956,634 A | * | 9/1999 | Otterson et al. ............ 455/410 |
| 6,173,172 B1 | * | 1/2001 | Masuda et al. ............. 455/410 |
| 6,266,541 B1 | * | 7/2001 | Noda .......................... 455/565 |
| 6,370,402 B1 | * | 4/2002 | Hakomori ................. 455/550.1 |

FOREIGN PATENT DOCUMENTS

| | | | |
|---|---|---|---|
| GB | 2318707 A | 4/1998 | |
| GB | 2 318 707 A | * 4/1998 | ............ H04Q/7/32 |
| JP | 04-090249 | 3/1992 | |
| JP | 09312687 | 12/1997 | |
| JP | 2000-078663 | 3/2000 | |

OTHER PUBLICATIONS

European Search Report dated Mar. 15, 2001.

* cited by examiner

*Primary Examiner*—Brandon Miller
(74) *Attorney, Agent, or Firm*—Knoble Yoshida & Dunleavy

(57) ABSTRACT

Portable wireless communication terminals such as cellular phones are equipped with features that are useful in controlling an operational mode in response to termination attempts according to a predetermined set of rules. When the rules are satisfied, the mode switch process in the remote cellular phone is able to change its operational mode without establishing a line connection. In addition, the remote cellular phone is also able to display a predetermined message such as contact information that is helpful in returning a lost cellular phone to an owner.

25 Claims, 4 Drawing Sheets

(a) MESSAGE INPUT SCREEN (b) TERMINATION PARAMETER SETTING SCREEN (c) Lock Status Setting Screen

REMOTELY CONTROLLING OPERATION MODE OF PORTABLE WIRELESS COMMUNICATION TERMINALS

FIELD OF THE INVENTION

The current invention is generally related to cellular phones, and more particularly related to features that are useful in controlling an operational mode of remote cellular phones as well as in retrieving them when they are lost or left behind.

BACKGROUND OF THE INVENTION

It has been difficult to locate and retrieve misplaced or stolen portable wireless communication terminals such as cellular telephones. It has been also difficult for a finder of a lost cellular phone to locate the owner. In some instances, the finder abuses the lost cellular phone, and the original owner is responsible for those calls unless he or she terminates or suspend the cellular service. Although some cellular phones are equipped with a personal id feature to lock the operation, since this feature requires a user to enter a personal id every time the phone is powered on or a call is made, it is cumbersome to some users.

To improve the above problem, Japanese Laid Patent Publication No. Hei 9-312687 discloses a cellular phone with a crime-preventive feature. When the cellular phone with this feature is lost or stolen, an owner of the cellular phone is able to remotely shut off the lost or stolen phone. In order to remotely block the calling capability, the original owner calls the lost or stolen phone from any telephone. If the stolen phone has an off-hook response to the above call, the normal operation of the stolen phone resumes. On the other hand, the stolen phone fails to have an off-hook, the stolen phone initiates a mode switching process by incrementing a counter. When the counter value reaches a predetermined number of incomplete calls, the mode switching process establishes connection with an incoming call and generates a predetermined audible signal. Upon hearing the audible signal, the original owner enters a predetermined personal identification number to switch the operation of the lost cellular phone. When the entered personal identification number matches the predetermined personal identification number, the mode switching process generates another audible signal to indicate to the original owner that the lost cellular phone is now blocked. The blocked cellular phone can only receive incoming calls and prevents the abuse by the founder. Upon confirmation of the blocked mode, the original owner terminates the mode switching process. The mode switching process can be reinitiated by the above described acts and reverse the blocked cellular phone for normal operation.

The above described prior art reference still fails to solve some issues. One issue is that the owner has to possess or remember a predetermined personal identification number in order to remotely block a remote cellular phone. In addition, the personal identification number is remotely inputted into the remote cellular phone only when the connection is established. For some reason or another, if the connection is not established, the remote phone cannot change its operational mode. The mode switching process cannot be independently completed without the connection and the correct personal identification number. Significantly, the above described prior art reference fails to provide a solution for facilitating the return of a remote cellular phone to an original owner.

SUMMARY OF THE INVENTION

In order to solve the above and other problems, according to a first aspect of the current invention, a method of remotely switching an operation mode of portable wireless communication terminals via a wireless network, including: inputting mode switch parameters including a time period and a number of terminations to a first portable wireless communication terminal in a normal operation mode; storing the mode switch parameters in the first portable wireless communication terminal; attempting to connect to the first portable wireless communication terminal from a single second wireless communication terminal when a predetermined event occurs; determining whether or not the single second portable wireless communication terminal has attempted to connect to the first wireless communication terminal without an off-hook at the first wireless communication terminal for the number of the terminations within the time period; and switching an operation mode of the first wireless communication terminal from the normal operation mode to a lost mode in response to the determining.

According to a second aspect of the current invention, a system for remotely switching an operation mode of portable wireless communication terminals via a wireless network, including: a first portable wireless communication terminal; a second portable wireless communication terminal further including: an input unit inputting mode switch parameters including a time period and a number of terminations to be used for switching an operation mode from a normal operation mode to a lost mode; a storage unit connected to the input unit for storing the mode switch parameters; and a processing unit for generating a mode switch signal when an identical one of the first portable wireless communication terminal has attempted to connect to the wireless communication terminal without an off-hook at the second wireless communication terminal for the number of the terminations within the time period, the processing unit switching the operation mode of the second wireless communication terminal from the normal operation mode to the lost mode in response to the mode switch signal.

According to a third aspect of the current invention, an apparatus for remotely switching an operation mode of portable wireless communication terminals via a wireless network, the apparatus communicating with the wireless communication terminals, including: an input unit for inputting mode switch parameters including a time period and a number of terminations to be used for switching an operation mode from a normal operation mode to a lost mode; a storage unit connected to the input unit for storing the mode switch parameters; and a processing unit for generating a mode switch signal when an identical one of the portable wireless communication terminals has attempted to connect to the apparatus without an off-hook at the apparatus for the number of the terminations within the time period, the processing unit switching the operation mode of the apparatus from the normal operation mode to the lost mode in response to the mode switch signal.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
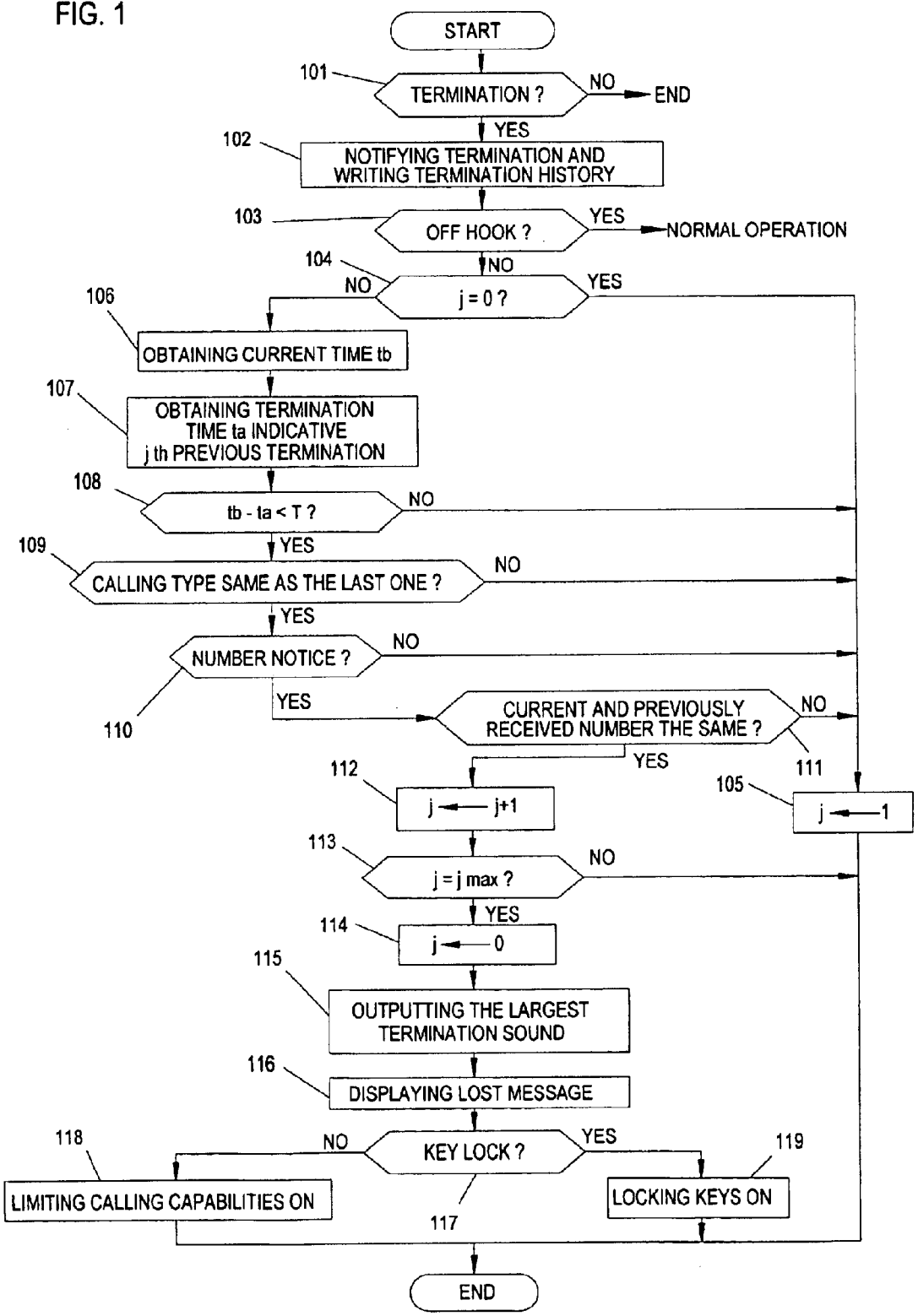
FIG. 1 is a flow chart illustrating acts involved in a preferred method of remotely controlling an operational mode of a portable wireless communication terminal according to the current invention.

Referring now to the drawings, wherein like reference numerals designate corresponding structures throughout the views, and referring in particular to FIG. 1, a flow chart illustrates acts involved in a preferred method of remotely switching an operational mode of a portable wireless communication terminal according to the current invention. When an incoming call comes to the portable wireless communication terminal, unless it is a termination, a mode switch process in the portable wireless communication terminal fails to proceed as shown in Act 101. On the other hand, when it is a termination, the mode switch process in the portable wireless communication terminal according to the current invention proceeds to Act 102 where the termination is notified by a predetermined output such as an audible signal. The termination information includes time, date and a calling type such as a number notification and a non-number notification, a public phone and analog/digital distinction. In Act 102, for example, the termination information for the last twenty calls is stored in a predetermined termination history storage unit. In response to the termination notice, Act 103 determines whether or not an off-hook takes place. That is, if the incoming call is accepted for connection. If an off-hook takes place, the normal operation of the wireless communication terminal resumes.

Still referring to FIG. 1, when the wireless communication terminal is misplaced or stolen, no off-hook often takes place in response to the incoming termination. In the absence of off-hook, the mode switch process determines in Act 104 whether or not a counter j is set to contain a zero value. The counter j is initialized to zero upon each time power is turned on, and a subsequent termination increments the counter value by one. If it is zero, the mode switch process sets the counter value to one in Act 105 and terminates its process. On the other hand, the counter value j is not equal to zero, the mode switch process obtains the current time tb in Act 106 and retrieves a termination time ta of the jth previous termination in Act 107. The jth previous termination is in fact the last termination in this exemplary mode switch process, but it is not limited to the last time in other mode switch processes according to the current invention. An amount of time in difference between the current time tb and the last termination time ta is now compared to a predetermined time period T in Act 108. If the difference is not less than the predetermined time period T, the counter value j is initialized to one in Act 105. That is, the current termination took place after the predetermined amount of time T subsequent to the last termination. In contrast, if the current termination took place within the predetermined amount of time T subsequent to the last termination, the information is examined in the following acts.

FIG. 1 shows that the mode switch process examines whether or not the origin of a current termination is identical to that of the previous or last termination. In Act 109, it is determined whether or not a calling type of the current termination is the same as that of the previous termination. After determining in Act 110 that the current termination is a number notice, it is further determined in Act 111 whether or not a receiving number of the current termination is the same as that of the previous termination. If any of the above three determination results from Acts 109, 110 and 111 is negative, the mode switch process performs Act 105 and terminates. On the other hand, all of the three determination results from Acts 109, 110 and 111 are affirmative, the counter value j is incremented by one in Act 112. The uniformly affirmative results indicate that a current termination is made from the identical origin within a predetermined time period T. Acts 109, 110 and 111 attempt to distinguish calls that are received from various origins while the portable wireless communication terminal is left behind at a certain known place for example at home, and it is not misplaced or stolen. Thus, Acts 109, 110 and 111 substantially eliminate a possibility of an accidental or unintended mode switch in the portable wireless communication terminal by ascertaining that the termination attempts are intentionally made from the same origin for a predetermined number of times within a predetermined time period.

To alter the operational mode, the mode switch process completes the following acts. The incremented counter value j is compared to a predetermined maximal counter value j max in Act 113. If the comparison indicates that the current counter value j has not reached the predetermined j max value, the mode switch process terminates without performing Act 105. In case, the counter value j has reached the predetermined j max value, the mode switch process changes the operation mode. First, the counter value j is initialized to zero in Act 114. Then, to notify or alarm a person near the misplaced or stolen wireless communication terminal, the mode switch process generates an audible signal for example at the highest level for twenty seconds in Act 115 and displays a message or contact information such as a phone number for returning the wireless communication terminal in Act 116. Finally, based upon a predetermined key lock preference in Act 117, the mode switch process either limits the calling capability in Act 118 or locks the keys in Act 199 and terminates.

The above described mode switch process enables an owner of the cellular phone to remotely control the operational mode without connection as well as a password or a personal identification number. As soon as an owner realizes that the cellular phone has been lost or stolen, the above feature allows the owner to quickly eliminate potential abuse of the cellular phone without incurring any calling cost. An additional feature of displaying some contact information also facilitates the return of a lost cellular phone. Later, when the cellular phone is returned, in order to reverse the locked operational mode, the owner has to enter a predetermined password or a personal identification number into the cellular phone in one preferred process according to the current invention. The password substantially prevents undesired reversal of the locked or limited operational mode prior to return. The need for passwords outweighs the cumbersome memorization and does not contradict with initial urgency for placing the cellular phone into a locked or limited mode without a password.

Figure 2:
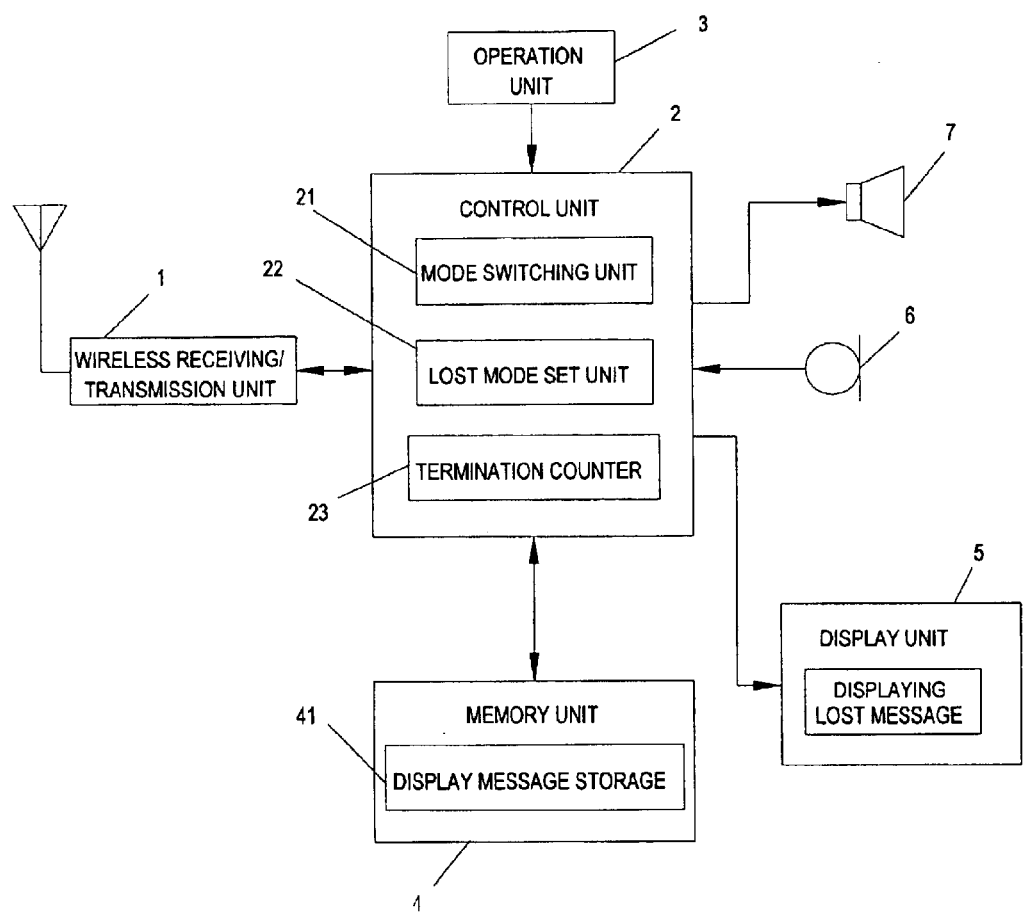
FIG. 2 is a block diagram illustrating one preferred embodiment of the portable wireless communication terminal according to the current invention.

Now referring to FIG. 2, a block diagram illustrates one preferred embodiment of the portable wireless communication terminal according to the current invention. The portable wireless communication terminal or cellular phone includes a wireless receiving/transmission unit 1 for receiving and transmitting wireless communication signals, a control unit 2 for controlling and processing information, an operational unit 3 for inputting data in the cellular phone, a memory unit 4 for storing software and data such as messages or phone numbers, a display unit 5 for displaying a message, a microphone 6 for inputting voice data and a speaker 7 for outputting voice data.

Still referring to FIG. 2, the control unit 5 further includes a mode switching unit 21, a lost mode set unit 22 and a termination counter 23. A user invokes the lost mode set unit 22 to be in the parameter setting mode via the operation unit 3. In the parameter setting mode, the user inputs mode switch parameters as well as lost messages or contact information via the operation unit 3 such as key pad and other buttons on the cellular phone and/or the display unit 5. The mode switch parameters include a number of terminations to be made from an identical origin as well as a time period within which these terminations are to be made and provide a predetermined set of rules or conditions for switching an operational mode of a remote cellular phone. The mode switch parameters also include a rule for how the cellular phone is limited or locked when the mode is remotely switched according to the above rules. The lost messages or contact information include a phone number of an owner or a short message. A display message storage unit 41 of the memory unit 4 stores the above inputted information.

The mode switching unit 21 with the termination counter 23 generally determines whether or not the operational mode of a cellular phone is to be switched. In other words, the mode switching unit 21 determines whether or not the predetermined conditions as set forth in the above mode switch parameters are met. To do so, the mode switching unit 21 processes information, stores and updates a number of termination attempts in the termination counter 23, retrieves the mode switch parameters from the memory unit and compares the retrieved information. The termination counter is initialized whenever power is turned on. When the mode switching unit 21 determines that the mode switching conditions are met, the mode switching unit 21 switches the operational mode to a predetermined limited mode and or a locked mode. The mode switching unit 21 further retrieves a display message from the display message storage 41 and sends the message to the display unit 5 for displaying the same.

Figure 3A:
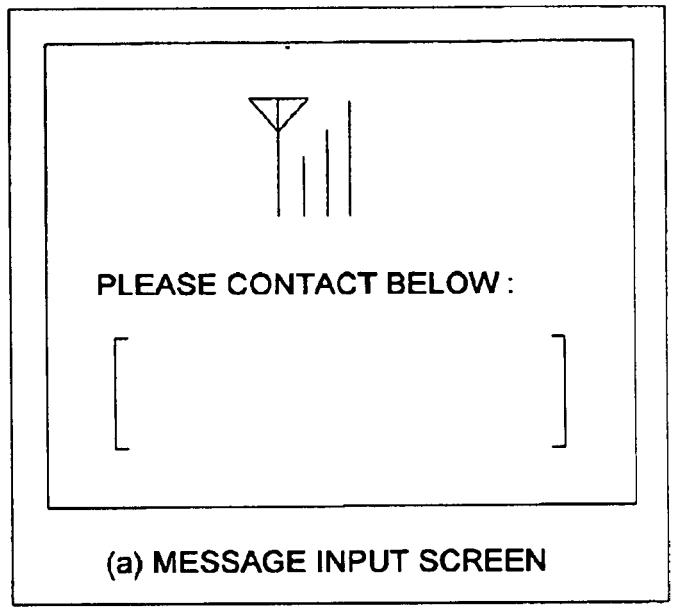
FIGS. 3A, 3B and 3C are diagrams respectively illustrating an exemplary message input screen, an exemplary termination parameter setting screen and an exemplary lock status setting screen for use with the portable wireless communication terminal according to the current invention.
Figure 3B:
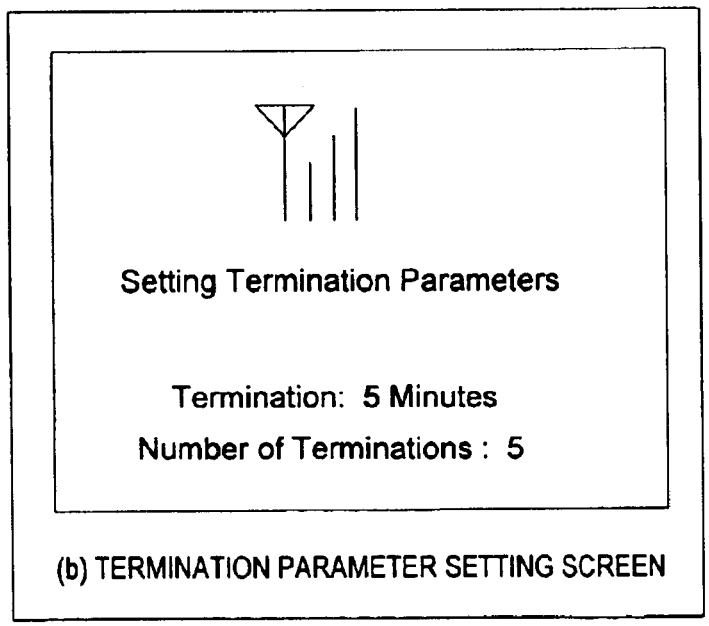
Figure 3C:
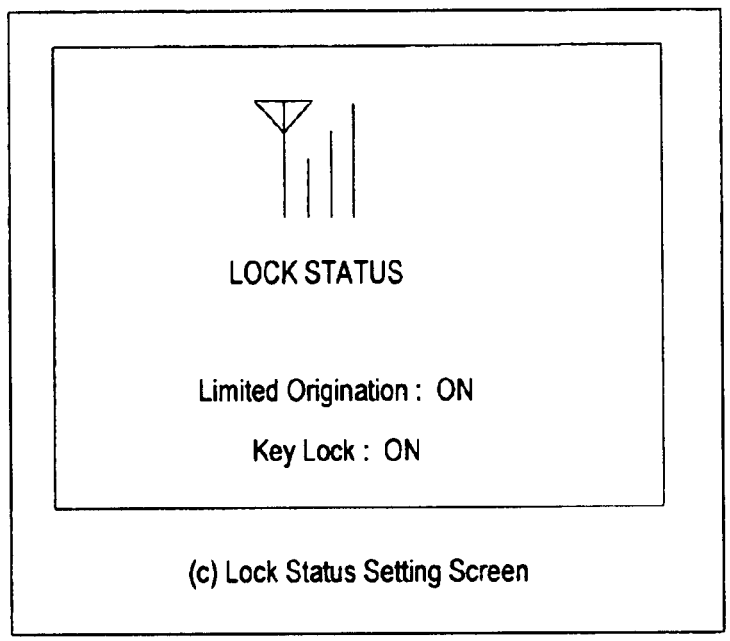
Figure 4:
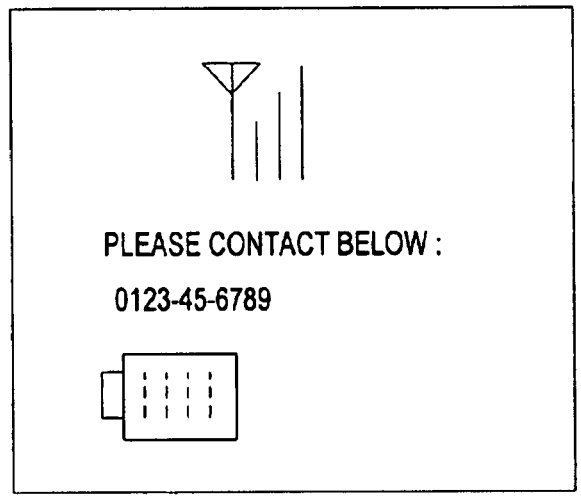
FIG. 4 is a diagram illustrating an exemplary contact information message for use with the portable wireless communication terminal according to the current invention.

FIGS. 3A, 3B and 3C are diagrams respectively illustrating an exemplary message input screen, an exemplary termination parameter setting screen and an exemplary lock status setting screen for use with the portable wireless communication terminal according to the current invention. Referring to FIG. 3A, a message to be displayed when the mode switch takes place is inputted through the screen. According to this example, the message "PLEASE CONTACT BELOW:" is fixed and previously stored. The user is allowed to input information or message in the bracketed area through the keyboard on a cellular phone. For example, contact information is provided in up to three lines, and "Please contact below: 0123-45-6789" is inputted and stored. Later, when the stored message is displayed, FIG. 4 shows the stored message. After the message input screen, a termination parameter setting screen as shown in FIG. 3B appears according to this exemplary implementation. This screen allows the user to input conditions to be met for the cellular phone to remotely switch its operational mode. In this exemplary conditions, it is shown that when five termination attempts occur within a period of five minutes between any two of the five termination attempts from the same origin, the operational mode is switched. The user inputs the desired number as well as the desired time in this input screen, and the input information is stored. Lastly, referring to FIG. 3C, the user selects a desired setting in the switched mode. For example, in the locked mode, the user turns either or both of limited origination and key lock selections. Under the limited origination condition, only a predetermined number of phone calls are made. On the other hand, under the key lock condition, no call is made. The selection is also stored.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of remotely switching an operation mode of a portable wireless communication terminal via a wireless network, comprising:

inputting mode switch parameters including a time period and a predetermined number of terminations to a first communication terminal, said first communication terminal being portable, wireless, and initially in a normal operation mode and later in a lost mode if the portable wireless communication terminal is misplaced;

storing the mode switch parameters in the first communication terminal;

attempting to connect to the first communication terminal from a second communication terminal when a predetermined event occurs;

determining whether or not the same one of the second communication terminal has attempted to connect to the first communication terminal for the predetermined number of the terminations without an off-hook at the first communication terminal within the time period allowed between every two consecutive ones of the terminations; and switching an operation mode of the first communication terminal from the normal operation mode to the lost mode in response to said determining.

2. The method of remotely switching an operation mode according to claim 1 wherein the predetermined event includes that the first communication terminal is lost and no longer under possession of an original owner of the first communication terminal.

3. The method of remotely switching an operation mode according to claim 2 wherein a predetermined message is displayed at the first communication terminal in the lost mode.

4. The method of remotely switching an operation mode according to claim 3 wherein the predetermined message includes contact information for returning the first communication terminal to the original owner.

5. The method of remotely switching an operation mode according to claim 1 wherein an audio signal is generated at the first communication terminal in the lost mode.

6. The method of remotely switching an operation mode according to claim 1 wherein the first communication terminal has a predetermined limited calling capability in the lost mode.

7. The method of remotely switching an operation mode according to claim 1 wherein the mode switch parameter additionally includes contact information for returning the first communication terminal to the original owner.

8. The method of remotely switching an operation mode according to claim 1 wherein said determining further comprises:
   comparing an origin of the second communication terminal in a current attempt and that in a previous attempt;
   incrementing a counter by one when the origin of the second communication terminal is the same in the current attempt and the previous attempt within the time period;
   initializing the counter to one when the origin of the second communication terminal is different in the current attempt and the previous attempt; and
   switching the operation mode of the first communication terminal from the normal operation mode to the lost mode when the counter indicates the number of the terminations.

9. The method of remotely switching an operation mode according to claim 8 wherein the origin in said comparing includes a type, a calling type, and a receiving number.

10. A system for remotely switching an operation mode of a portable wireless communication terminal via a wireless network, comprising:
    a first communication terminal;
    a second communication terminal being portable and wireless, said second communication terminal initially in a normal operation mode further including:
    an input unit for inputting mode switch parameters including a time period and a predetermined number of terminations to be used for switching an operation mode from the normal operation mode to a lost mode;
    a storage unit connected to the input unit for storing the mode switch parameters; and
    a processing unit for generating a mode switch signal when said first communication terminal has attempted to connect to the same one of said second communication terminal for the predetermined number of the terminations without an off-hook at said second communication terminal within the time period allowed between every two consecutive ones of the terminations, the processing unit switching the operation mode of said second communication terminal from the normal operation mode to the lost mode in response to the mode switch signal.

11. The system for remotely switching an operation mode according to claim 10 wherein said second communication terminal further includes a display unit connected to the processing unit for displaying a predetermined message in response to the mode switch signal.

12. The system for remotely switching an operation mode according to claim 11 wherein the predetermined message includes contact information for returning said second communication terminal to an original owner.

13. The system for remotely switching an operation mode according to claim 10 wherein said second communication terminal further includes an audio generating unit connected to the processing unit for generating an audible signal in response to the mode switch signal.

14. The system for remotely switching an operation mode according to claim 10 wherein the processing unit places said second communication terminal in a predetermined limited calling capability in response to the mode switch signal.

15. The system for remotely switching an operation mode according to claim 10 wherein the mode switch parameter additionally includes contact information for returning the second communication terminal to the original owner.

16. The system for remotely switching an operation mode according to claim 10 wherein the processing unit further comprises:
    a comparison sub-unit for comparing an origin of said first communication terminal in a current attempt and that in a previous attempt;
    a counter sub-unit connected to the comparison sub-unit for incrementing a counter value by one when the origin of said first communication terminal is the same in the current attempt and the previous attempt within the time period, the counter sub-unit initializing the counter value to one when the origin of said first communication terminal is different in the current attempt and the previous attempt; and
    a switching sub-unit connected to the counter sub-unit for switching the operation mode of said second communication terminal from the normal operation mode to the lost mode when the counter value indicates the number of the terminations.

17. The system for remotely switching an operation mode according to claim 16 wherein the comparison sub-unit compares the origin including a type, a calling type, and a receiving number.

18. An apparatus for remotely switching an operation mode of a plurality of portable wireless communication terminals via a wireless network, said apparatus communicating with the portable wireless communication terminals, comprising:
    an input unit for inputting mode switch parameters including a time period and a predetermined number of terminations to be used for switching an operation mode from a normal operation mode to a lost mode;
    a storage unit connected to the input unit for storing the mode switch parameters; and
    a processing unit for generating a mode switch signal when a single communication terminal has attempted to connect to the same one of the portable wireless communication terminals for the predetermined number of the terminations via said apparatus without an off-hook at said apparatus within the time period allowed between every two consecutive ones of the terminations, the processing unit switching the operation mode of said one of the portable wireless communication terminals in said apparatus from the normal operation mode to the lost mode in response to the mode switch signal.

19. The apparatus for remotely switching an operation mode according to claim 18 further comprising a display unit connected to the processing unit for displaying a predetermined message in response to the mode switch signal.

20. The apparatus for remotely switching an operation mode according to claim 19 wherein the predetermined message includes contact information for returning said apparatus to an original owner.

21. The apparatus for remotely switching an operation mode according to claim 18 further comprising an audio generating unit connected to the processing unit for generating an audible signal in response to the mode switch signal.

22. The apparatus for remotely switching an operation mode according to claim 18 wherein the processing unit places said apparatus in a predetermined limited calling capability in response to the mode switch signal.

23. The apparatus for remotely switching an operation mode according to claim 18 wherein the mode switch parameter additionally includes contact information for returning the first wireless communication terminal to the original owner.

24. The apparatus for remotely switching an operation mode according to claim 18 wherein the processing unit further comprises:
   a comparison sub-unit for comparing an origin of the communication terminal in a current attempt and that in a previous attempt;
   a counter sub-unit connected to the comparison sub-unit for incrementing a counter value by one when the origin of the communication terminal is the same in the current attempt and the previous attempt within the time period, the counter sub-unit initializing the counter value to one when the origin of the communication terminal is different in the current attempt and the previous attempt; and
   a switching sub-unit connected to the counter sub-unit for switching the operation mode of said apparatus from the normal operation mode to the lost mode when the counter value indicates the number of the terminations.

25. The apparatus for remotely switching an operation mode according to claim 24 wherein the comparison sub-unit compares the origin including a type, a calling type, and a receiving number.

* * * * *